United States Patent
Mosler et al.

[11] 3,855,074
[45] Dec. 17, 1974

[54] PLURAL TEMPERATURE CONTROLS OF DISTILLATION

[75] Inventors: Henry A. Mosler; Richard Weber, both of Morristown, N.J.

[73] Assignee: Esso Research & Engineering Company, Linden, N.J.

[22] Filed: Sept. 10, 1973

[21] Appl. No.: 395,929

[52] U.S. Cl. ................. 203/2, 203/3, 203/DIG. 18, 102/160, 202/206, 235/151.12
[51] Int. Cl. ............................................ B01d 3/42
[58] Field of Search ......... 203/2, DIG. 18; 202/160, 202/206; 196/132; 208/DIG. 1; 235/151.12

[56] References Cited
UNITED STATES PATENTS

| | | | |
|---|---|---|---|
| 2,684,326 | 7/1954 | Boyd | 203/2 |
| 3,321,380 | 5/1967 | Hillburn | 203/2 |
| 2,489,949 | 11/1949 | Blair | 196/141 |
| 3,464,895 | 9/1969 | Boyd | 203/2 |
| 2,580,651 | 1/1952 | Boyd | 203/2 |
| 2,994,643 | 8/1961 | Smalling | 203/2 |
| 2,252,550 | 8/1941 | Bragg | 196/132 |
| 2,965,549 | 12/1960 | Hudkins | 203/2 |
| 2,995,500 | 8/1961 | Delbert | 203/2 |
| 3,773,627 | 11/1973 | Weber et al. | 203/2 |

*Primary Examiner*—Wilbur L. Bascomb, Jr.
*Attorney, Agent, or Firm*—Harold N. Wells; F. Donald Paris; Donald F. Wohlers

[57] ABSTRACT

A method and apparatus for controlling the operation of a one feed, two-product multi-component distillation column to obtain products of the desired quality. Temperatures measured near the product withdrawal points are added and used as an index of the split between overhead and bottom products. The same temperatures are subtracted and used as an index of the products' purities. Adjustments related to these two indices may be made to bring the split and product on specification.

20 Claims, 6 Drawing Figures

PLURAL TEMPERATURE CONTROLS OF DISTILLATION

BACKGROUND OF THE INVENTION

The invention is directed to the general field of instruments for control of distillation columns such as are commonly used in the petroleum and chemicals industries. Many techniques have been used for the control of such columns, details of which may be extremely complex. Application Ser. No. 207,485 filed Dec. 13, 1971 and now U.S. Pat. No. 3,773,627 and jointly assigned with the present application discusses the background of the prior art and is incorporated by reference into the present application.

The earlier application disclosed a system for control of a one feed, two-product multi-component distillation column wherein at least a pair of temperatures were measured well away from the feed point where the temperatures were "one-way sensitive" to changes in the split between overhead and bottom products. That is, the temperature near the overhead product withdrawal point was related solely to the quality of the overhead product and insensitive to the quality of the bottom product and conversely, the temperature point near the bottom withdrawal point was located so as to be sensitive only to the bottom product quality and insensitive to the overhead product. These one-way sensitive temperature points were added and the sum used to control the tower operation. Only a single variable had to be controlled. Preferably, the reboiler was controlled although adjustment of other variables could also be made which would also influence the relative internal flow rates e.g. reflux rate or the withdrawal rate of either product. The method was shown to have distinct advantages over the single point temperature control commonly used in the prior art, which inherently requires the temperature sensing point to have "two-way sensitivity." The method was also shown to be preferred over the prior art systems wherein differential temperatures were measured near the feed tray.

The present invention is directed to a further improvement of the control technique of the earlier application. That method was applicable to many multicomponent distillation columns, but not all. In order to understand the reason for this and the problems involved, two types of separations within a distillation column will be defined. The first separation to be defined is the "split." Ideally, a precise separation would be made between two components in a multicomponent system, for example, in a typical hydrocarbon system such as a debutanizer, butane and all lighter components would be separated from components heavier than butane such as pentane. Actually, of course, this is not done. Tolerances for butane in the heavier product (and vice versa) must be established. Split, however, refers in general to gross separation are not to these tolerances. A split index may be arbitrarily defined as follows:

$$\text{Split index} = \frac{\text{Percent heavy key component in overhead (light) product}}{\text{Percent light key component in bottom (heavy) product}} \quad (1)$$

Where: the key components are those hydrocarbons which are used to define the separation e.g. the light key is butane and the heavy key is pentane. While the split is defined in terms of the tolerances, examining this definition it can be seen that the overall separation between light and heavy materials could be under control while the tolerances could be out of control, and the absolute purities of the products could be seriously degraded. In the earlier invention, selected rectification (above the feed point) and stripping (below the feed point) section temperatures (which were sensitive only to local changes in composition) were measured, added together, and the sum used for tower control. The rectification section temperature was proportional to the amount of the heavy key component in the overhead product and the stripping section temperature was proportional to the amount of the light key component in the bottoms product. If only one of those temperatures changes significantly, which was the case in a one-way sensitive tower, then correcting the sum of the temperatures was equivalent to correcting whichever one of the products was off specification. Making that correction would correct both the split and the product compositions. Of course, it is possible that for some towers this method would work reasonably well in spite of the fact that the tower was not fully one-way sensitive.

For other towers, however, if the feed composition changed the control system could produce the same overall split of the feed between overhead and bottoms but the product purities would be degraded and not detected by the split control system.

Thus, split control is not always enough. What is needed can be called fractionation control. Fractionation will be defined according to a Fractionation Index as follows:

Fractionation Index
= Percent heavy key component in overhead product
+ Percent light key component in bottom product
(2)

Fractionation Index defines the total amount of impurities. If one holds Fractionation Index constant, it can be seen that the purities are not necessarily on specification. However, if both the Fractionation Index and the Split Index are simultaneously held constant, both the overall split of the feed and the desired product purities will be attained.

As a rough example, consider a distillation tower making a split between two products such that there remains one percent of the heavy key component in the overhead product and one percent of the light key component in the bottom product. In the event of an upset the Split Index control could provide a satisfactory split while failing to produce acceptable products. If the impurity level at both ends of the tower after correction by the Split Index Control was 2 percent, the overall separation would be satisfactory, but the Fractionation Index would be twice what it should be. But, a control system for Fractionation Index superimposed upon a Split Index control would have the capability of providing on-specification products. It is the object of the present invention to provide for control of both Fractionation Index and Split Index for those towers for which Split Index Control is not completely satisfactory.

Direct and independent control of the temperatures at the top and bottom of a tower is not generally practicable. Dynamic interaction of the two independent controllers would make such an approach unsatisfactory even for those towers having one-way sensitivity and for which the Split Index control alone can be applied. In many towers not exhibiting one-way sensitivity, the upper and lower temperature can not be related solely to the adjacent product quality and the Fractionation Index must be controlled in addition to the Split Index. In order to control both Split Index and Fractionation Index, a novel control system has been developed which is disclosed more completely below.

SUMMARY OF THE INVENTION

Temperature measuring points are selected in a distillation column well away from the feed entry point and near the product withdrawal points, nominally about 20 percent of the distance between the Product withdrawal points and the feed tray. Split Index (temperature adding) control is applied as in the earlier invention and may be used to control the heat input to the reboiler. The same two temperature points are subtracted and, after applying a correction factor related to the distillate-to-feed ratio, the corrected value is used as the Fractionation Index for adjusting a variable, generally the reflux rate, which is controlled independently of the reboiler. In combination, these two control systems provide control of both Split Index and Fractionation Index, thereby providing correct product qualities in spite of large changes in feed composition. Dynamic interactions of the two control systems are avoided by providing relatively rapid temperature control through the Split Index control system while making corrections with Fractionation Index control much slower.

DESCRIPTION OF THE PREFERRED EMBODIMENT

Figure 1:
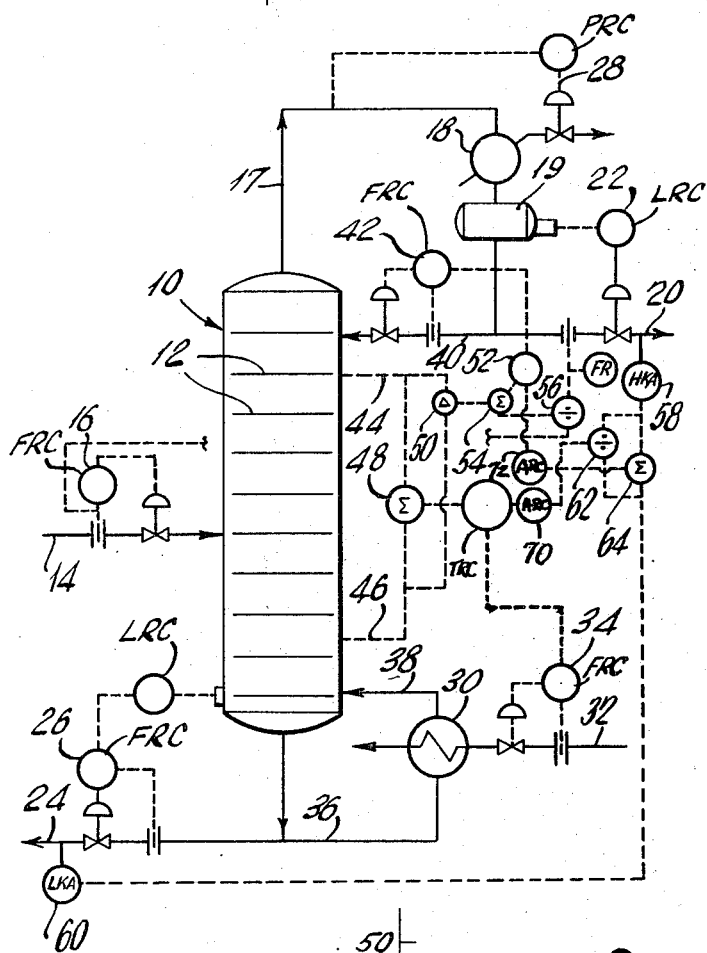
FIG. 1 illustrates in schematic form an application of the present invention to a one-feed, two-product distillation tower.

An application of the invention is illustrated in FIG. 1. A typical one-feed, two-product distillation column is shown generally as 10. The column contains fractionating trays 12 which may be of any type, e.g. sieve tray, bubble cap tray, jet tray or others. Those above the feed tray will be referred to as rectifying trays, those below as stripping trays. Feed to the column 10 enters through line 14 under control of Flow Recorder Controller (FRC) 16. The lighter product passes overhead as a vapor through line 17, condenses in condenser 18, accumulates in overhead drum 19, and is released by Level Recorder Controller (LRC) 22 to further processing or to storage through line 20. Pressure within the column is controlled by Pressure Recorder Controller (PRC) 28 which controls cooling water flow to the condenser 18. Controlling the pressure within the column permits the temperature instrumentation to indicate composition changes which may occur. The heavier product is discharged as a liquid through line 24 under control of cascade controller Level Recorder Controller-Flow Recorder Controller (LRC-FRC) 26. Heat is provided via line 32 to reboiler 30 by such media as steam, hot oil or process streams under control of cascade controller Temperature Recorder Controller-Flow Recorder Controller (TRC-FRC) 34.

Liquid having the same composition as the product in line 24 passes through line 36 to the reboiler 30 where it is vaporized and returns via line 38 to column 10. Vapor generated in this manner passes up through the column, condensing on the trays and vaporizing liquid flowing countercurrently downward. The condensation and vaporization deplete the vapor of heavier components and enrich it in lighter components, thereby achieving the desired separation. Liquid is provided via line 40 under control of FRC 42. It enters on the top tray and flows down from tray-to-tray, condensing the heavier vapors rising from below.

Temperature points 44 and 46 located within the column provide signals which are combined by adding transmitter 48 and which provide a signal to TRC-FRC 34 for control of heat to reboiler 30 in accordance to the earlier invention covered by application Ser. No. 207,485. Such a system will successfully control the split of the feed into products for columns which exhibit one-way sensitivity as disclosed in the earlier application. That is, the temperature on a selected tray near the top of the column reflects only the overhead product purity and is insensitive to the bottom product purity. Conversely, the temperature on a selected tray near the bottom column is sensitive only to the bottom product purity and is insensitive to the overhead product purity. It is this one-way sensitivity which permitted the addition of these two temperature points which operate independently of each other to indicate the split being between light and heavy components. This control system will be designated here Split Index control rather than temperature adding control.

In some towers Split Index Control maintains the desired split but the absolute product qualities vary. In accordance with the present invention, the same temperatures, 44 and 46, which are added in applying the Split Index control system are subtracted in subtracting transmitter 50 and the temperature difference is combined in adding transmitter 54 by a correction factor produced by dividing transmitter 56 proportional to the ratio of the overhead product rate to the feed rate to obtain Fractionation Index. Thus Fractionation Index is obtained indirectly by the following equation.

(3)
$$F.I. = T_{stripping\ section} - T_{rectifying\ section} + \text{Constant} \left(\frac{\text{Distillate Rate}}{\text{Feed Rate}}\right)$$

The Fractionation Index is used by TRC-52 to control reflux to the tower by adjusting FRC-42. In combination, the Split Index and Fractionation Index control systems provide on-specification products in spite of significant deviations from design feed composition.

Figure 2:
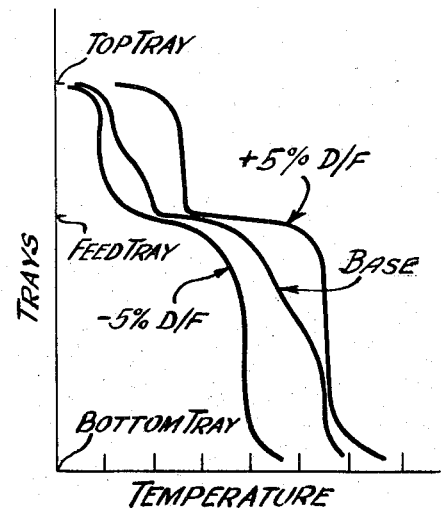
FIG. 2 shows typical tray temperature response to split changes in a tower which requires both Split Index and Fractionation Index control.
Figure 3:
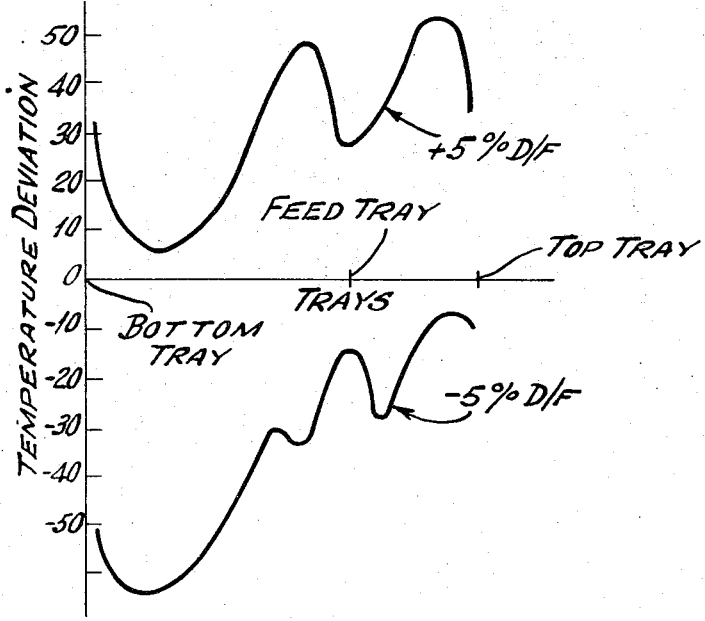
FIG. 3 illustrates a replotting of the data of FIG. 2 showing the changes in tray temperatures.
Figure 5:
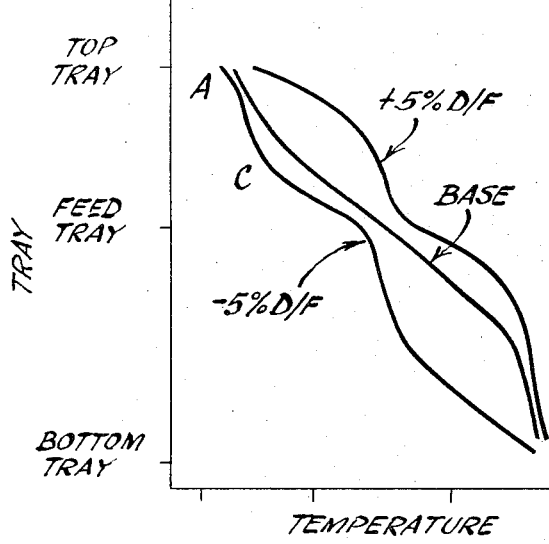
FIGS. 5 and 6 illustrate the performance of a tower of the earlier invention which, having one-way sensitivity, may be satisfactorily controlled by Split Index Control alone.
Figure 6:
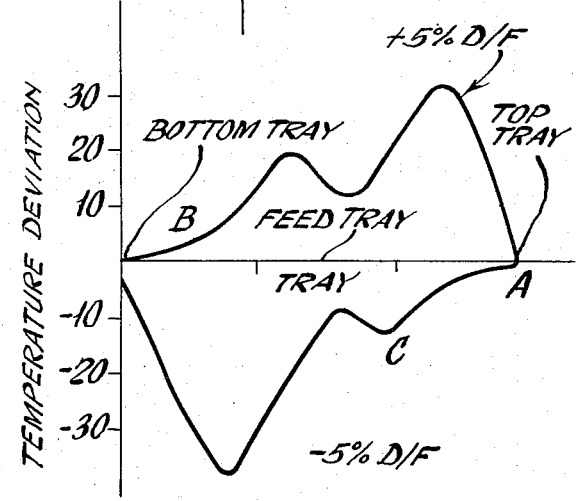

The response of the tower of FIG. 1 to a split change of ±5 percent expressed as distillate-to-feed ratio (but with no change to the reflux rate or feed composition) is shown in FIGS. 2 and 3. A change in distillate-to-feed ratio is a change in split between light and heavy components. Significant deviations in temperature occur across the tower when the split is varied. If the tower showed one-way sensitivity, FIGS. 2 and 3 would be significantly different. FIGS. 5 and 6 illustrate for comparison the corresponding curves for a tower having one-way sensitivity. In a tower having one-way sensitivity, an increase in distillate/fed ratio will show a large change in temperatures on trays near the top, but little change in temperature on a corresponding tray near the bottom, thus showing one-way sensitivity to split changes. In FIG. 3, the one-way sensitivity of FIG. 6 is not as clearly seen and the performance of such a tower with Split Index control alone is not much better than conventional single point temperature control. Split can be controlled but a loss of purity occurs which requires Fractionation Index Control to correct.

Figure 4:
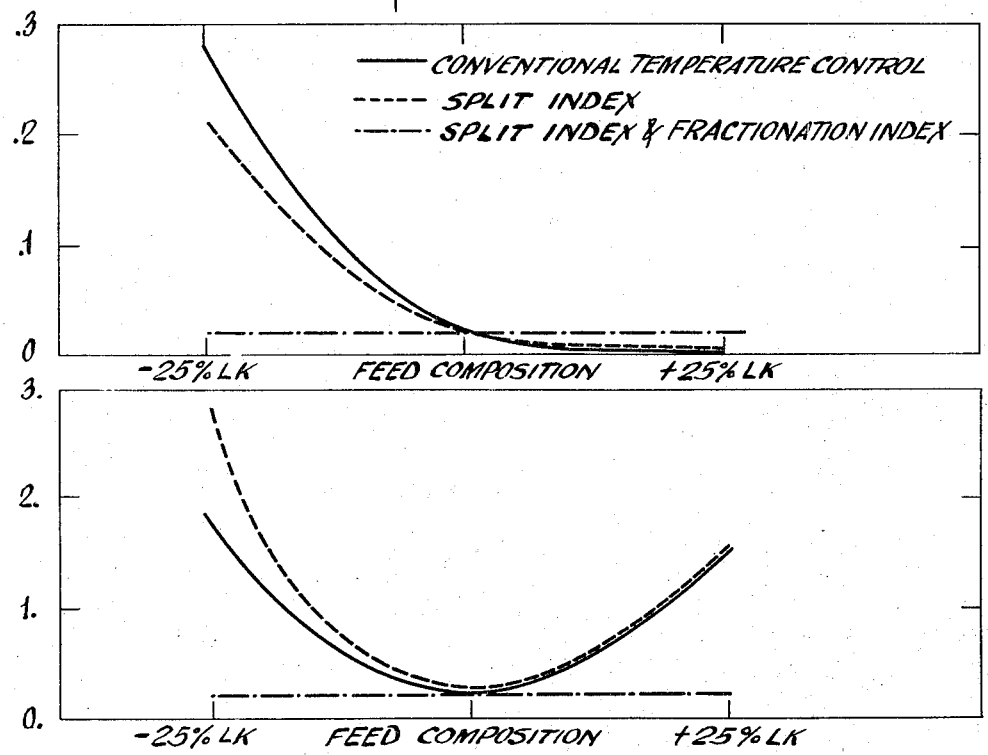
FIG. 4 illustrates the performance of the column of FIG. 2 and 3, comparing conventional single point temperature control, Split Index control, and Split Index plus Fractionation Index control.

FIG. 4 compares the substantially improved performance of the combination control system of the present invention with conventional single point control and the Split Index control system alone as applied to the tower of FIGS. 2 and 3. It will be seen that conventional single point temperature control and Split Index control provide clearly inferior performance. However, even with changes of ±25 percent in the light key component the combination control system (split + fractionation) corrects the tower performance so that both products remain on-specification.

Following the procedure used with the Split Index control system, the temperature sensing points are located well away from the feed tray, but also far enough from the product withdrawal trays to be sensitive to changes in actual product compositions (the actual withdrawal points are relatively insensitive). A location 20 percent of the distance between product withdrawal point and the feed tray is generally satisfactory. For any particular system it might be determined by computer simulation or field experiment that some other location would give improved performance. A range of 20-40 percent would usually give satisfactory results.

Although it is preferred that the reflux rate be controlled by the Fractionation Index controller, other modes of adjusting the performance in a column which would also accomplish an increase in the ratio of vapor to liquid rates within the tower could be used. Variables which are commonly used for tower control include the following: (1) reflux rate (2) reboiler heat supply (3) overhead product rate (4) bottoms product rate. The Split Index Control system may be applied to any of the foregoing variables and the Fractionation Index Control to another of the variables associated with the other ends of the tower i.e. preferred combinations include:

| Split Index Control | Fractionation Control |
| --- | --- |
| (1) | (2) |
| (2) | (1) |
| (3) | (2) |
| (4) | (1) |

In order to prevent the control systems from interacting dynamically, the Split Index control system will be tuned to maintain a close control of the combined temperatures. The Fractionation Index system, however, will be tuned sluggishly to slowly adjust the reflux-to-feed ratio in order to achieve the proper separation and product qualities as feed composition changes. A further improvement of this system would be to apply feed forward controls on the feed rate or other appropriate variables to improve the dynamic response of the system.

An even more sophisticated control system is also shown in FIG. 1 which would use onstream analyzers to directly measure Split Index and Fractionation Index according to equations (1) and (2) by measuring the heavy key component in the distillate by analyzer 58 and the light key component in the bottoms product by analyzer 60, dividing them in divider 62 to obtain Split Index and adding them in adder 64 to obtain the Fractionation Index and then resetting TRC-FRC-34 and TRC-52.

The invention as disclosed by the foregoing description of the preferred embodiment is by way of illustration only and should not be regarded as limiting the scope of the invention which is defined by the claims which follow.

What is claimed is:

1. A method of controlling a one-feed, two-product multicomponent distillation column to maintain the desired split between light and heavy key components and the overhead and bottoms product purities, said column having product withdrawals above and below the feed tray and including reboiler heat supply and overhead condenser heat removal facilities comprising the steps of:
    a. sensing the temperature on at least one tray above the feed tray between 20–40 percent of the distance between said top tray and the feed tray;
    b. sensing the temperature on at least one tray below the feed tray between 20–40 percent of the distance between said bottom tray and the feed tray;
    c. adding said sensed temperatures of (a) and (b) and thereby obtaining an index of the split between light and heavy components;
    d. controlling a first operating variable of the column according to the summed temperatures of (c);
    e. subtracting said sensed temperature of (a) from said sensed temperature of (b) and adding thereto a correction factor proportional to the ratio of overhead product rate to feed rate and thereby obtaining an index of the product purities;
    f. controlling a second operating variable of the column according to the index of (e).

2. The method of claim 1 wherein said first operating variable is the reflux rate to the column.

3. The method of claim 1 wherein said first operating variable is the overhead product withdrawal rate.

4. The method of claim 1 wherein the said first operating variable is the heat supply to the reboiler.

5. The method of claim 1 wherein the said operating first variable is the bottoms product withdrawal rate.

6. The method of claim 1 wherein the said second operating variable is the reflux rate to the column.

7. The method of claim 1 wherein the said second operating variable is the overhead product withdrawal rate.

8. The method of claim 1 wherein the said second operating variable is the heat supply to the reboiler.

9. The method of claim 1 wherein the said second operating variable is the bottoms product withdrawal rate.

10. In a one feed-two product multicomponent distillation column having a feed tray located between a plurality of rectifying trays and a plurality of stripping trays and having reflux and reboiling facilities, product quality control means comprising in combination:
   a. at least one temperature sensing means above said feed tray and between 20–40 percent of the distance between the top rectifying tray and said feed tray;
   b. at least one temperature sensing means below said feed tray between 20–40 percent of the distance between the bottom stripping tray and said feed tray.
   c. means for measuring the overhead product rate;
   d. means for measuring the feed rate;
   e. means for adding the sensed temperatures of (a) and (b) and thereby to obtain a Split Index characteristic of the overall separation between light and heavy components;
   f. means for subtracting the sensed temperature of (b) from the sensed temperature of (a) and for adding thereto a correction factor proportional to the ratio of the overhead product rate to the feed rate measured in (c) and (d) respectively, thereby obtaining a Fractionation Index characteristic of the product purities;
   g. means responsive to the summed temperature of (e) for adjusting a first operating variable of the column;
   h. means responsive to the corrected temperature difference of (d) for adjusting a second operating variable of the column.

11. The distillation column of claim 10 wherein the said first operating variable is the reflux rate to the column.

12. The distillation column of claim 10 wherein the said first operating variable is the overhead product withdrawal rate.

13. The distillation column of claim 10 wherein the first operating variable is the heat supply to the reboiler.

14. The distillation column of claim 10 wherein the said first operating variable is the bottoms product withdrawal rate.

15. The distillation column of claim 10 wherein the said second operating variable is the reflux rate to the column.

16. The distillation column of claim 10 wherein the said second operating variable is the overhead product withdrawal rate.

17. The distillation column of claim 10 wherein said second operating variable is the heat supply to the reboiler.

18. The distillation column of claim 10 wherein said second operating variable is the bottoms product withdrawal rate.

19. The distillation column of claim 10 further comprising:
   i. a first analyzer means for measuring the impurity content of said overhead product;
   j. a second analyzer means for measuring the impurity content of said bottoms product;
   k. a Split-Index Computer means for determining Split Index by dividing the impurity contents measured by said first and second analyzer means;
   l. a Fractionation Index Computer means for determining Fractionation Index by adding the impurity content of said overhead product measured in (i) to the impurity content said bottom product measured in (j);
   m. means responsive to the Split Index computer of (k) for adjusting said first operating variable;
   n. means response to the Fractionation Index computed in (l) for adjusting said second operating variable.

20. The method of claim 1 further comprising:
   g. analyzing for the heavy key component contained in said overhead product;
   h. analyzing for the light key component contained in said bottoms product;
   i. dividing the heavy key content obtained in (g) by the light key content obtained in (h) and thereby obtaining a Split Index characteristic of the overall separation in the column;
   j. controlling a first operating variable of the column according to the Split Index obtained in (i);
   k. adding the light key content of (h) to the heavy key content of (g) and thereby obtaining a Fractionation Index characteristic of the product purities;
   l. controlling a second operating variable of the column according to the Fractionation Index obtained in (k).

* * * * *